United States Patent
Laubmann et al.

(10) Patent No.: US 12,028,500 B2
(45) Date of Patent: Jul. 2, 2024

(54) METHOD OF TRANSFORMING A FIRST COLOR SPACE INTO A SECOND COLOR SPACE USING AN INTERMEDIATE COLOR SPACE, A PRINTING MACHINE FOR IMPLEMENTING THE METHOD AND A MEMORY MEDIUM CONTAINING CODE FOR PERFORMING THE METHOD

(71) Applicant: Heidelberger Druckmaschinen AG, Heidelberg (DE)

(72) Inventors: Tobias Laubmann, Dielheim (DE); Hauke Thomsen, Heikendorf (DE); Stefan Bollmann, Hamburg (DE); Stefan Schenk, Wiesenbach (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/876,850

(22) Filed: Jul. 29, 2022

(65) Prior Publication Data
US 2023/0041851 A1 Feb. 9, 2023

(30) Foreign Application Priority Data
Jul. 29, 2021 (DE) ...................... 10 2021 208 206.8

(51) Int. Cl.
*H04N 1/60* (2006.01)
(52) U.S. Cl.
CPC ..................... *H04N 1/60* (2013.01)
(58) Field of Classification Search
CPC .............................. H04N 1/60; H04N 1/6052
USPC ........................... 358/518, 1.9; 382/167, 162
See application file for complete search history.

(56) References Cited

U.S. PATENT DOCUMENTS

| | | | |
|---|---|---|---|
| 6,559,975 B1 * | 5/2003 | Tolmer | H04N 1/56 358/1.9 |
| 7,161,710 B1 | 1/2007 | MacLeod | |
| 8,014,027 B1 | 9/2011 | Kulkarni et al. | |
| 2004/0228525 A1 | 11/2004 | Krabbenhoft | |
| 2004/0239965 A1 | 12/2004 | Krueger et al. | |
| 2007/0046958 A1 * | 3/2007 | Hoof | H04N 1/6058 358/1.9 |

(Continued)

FOREIGN PATENT DOCUMENTS

| | | |
|---|---|---|
| DE | 10322378 A1 | 12/2004 |
| EP | 1152373 A2 | 11/2001 |
| EP | 2421242 A1 | 2/2012 |

OTHER PUBLICATIONS

International Color Consortium: ‚Black-point compensation: theory and application, White Paper 40, Jul. 27, 2010; URL: https://web.archive.org/web/20150106022520/https://www.color.org/WP40-Black_Point_Compensa-tion_2010-07-27. pdf; archived at https://web.archive.org am Jan. 1, 2015 [acceseed on May 4, 2022].

(Continued)

*Primary Examiner* — Jamares Q Washington
(74) *Attorney, Agent, or Firm* — Laurence A. Greenberg; Werner H. Stemer; Ralph E. Locher (57) ABSTRACT

A method transforms color values of a first device-dependent color space into the color values of a second device-dependent color space so that the visual impression of the color represented in the two-color spaces is essentially identical. The transformation of the color values combines at least one absolute rendering intent and at least one relative rendering intent.

16 Claims, 2 Drawing Sheets

(56) References Cited

U.S. PATENT DOCUMENTS

| | | | |
|---|---|---|---|
| 2007/0058181 A1 | 3/2007 | Hatori | |
| 2007/0188780 A1* | 8/2007 | Edge | H04N 1/603 |
| | | | 358/1.9 |
| 2008/0143738 A1 | 6/2008 | Woolfe et al. | |
| 2011/0249298 A1* | 10/2011 | Gullentops | B33Y 50/00 |
| | | | 358/1.18 |
| 2011/0286019 A1* | 11/2011 | Honeck | G06K 15/1805 |
| | | | 358/1.9 |
| 2012/0038938 A1* | 2/2012 | Oh | H04N 1/6058 |
| | | | 358/1.9 |

OTHER PUBLICATIONS

Phil Green: "Color Management: Understanding and Using ICC Profiles", Mar. 22, 2010 (Mar. 22, 2010), Wiley, XP055652861, ISBN: 978-0-470-05825-1.

* cited by examiner

Fig.2

METHOD OF TRANSFORMING A FIRST COLOR SPACE INTO A SECOND COLOR SPACE USING AN INTERMEDIATE COLOR SPACE, A PRINTING MACHINE FOR IMPLEMENTING THE METHOD AND A MEMORY MEDIUM CONTAINING CODE FOR PERFORMING THE METHOD

CROSS-REFERENCE TO RELATED APPLICATION

This application claims the priority, under 35 U.S.C. § 119, of German Patent Application DE 10 2021 208 206.8, filed Jul. 29, 2021; the prior application is herewith incorporated by reference in its entirety.

FIELD AND BACKGROUND OF THE INVENTION

The invention relates to a method of transforming color values of a first device-dependent color space into the color values of a second device-dependent color space. The method is applied in the printing industry, for example, to match visual color impressions to one another.

In the printing industry, artwork which includes all elements to be printed such as text, graphics, and images is created for print pages. If the artwork is created electronically, these elements are created in the form of digital data. For an image, for example, the data are generated by a scanner that scans the image dot by dot and row by row, splitting every image dot into color components and digitizing the color components. In general, a scanner splits the images into red, green, and blue (R, G, B) color components, i.e. into the components of a three-dimensional color space (RGB color space). A multicolor printing operation, however, for instance in a printing press, requires different color components. In four-color printing, these colors are the process colors, i.e. cyan, magenta, yellow, and black (C, M, Y, K), which are the components of a four-dimensional color space (CMYK color space).

For a printing operation, the image data need to be converted from the RGB color space of the scanner to the CMYK color space of the printing process that is utilized. If the CMYK image data created for a printing process are to be displayed on a screen (such as an LCD) as what is known as a soft proof or if the image data are to be output in advance as proofs on an inkjet printer, even more color transformations are required in each case to match the visual impression of the colors as closely as possible with the printing process that is later used for the production run.

The printing industry needs such color transformations because all devices and processes are subject to specific limitations and particularities in terms of the representation and reproduction of colors. Consequently, different devices and processes such as scanners, monitors, proof devices, printing processes, and the like have different color spaces which best describe the chromatic properties of the device or process in question. These color spaces are referred to as device-dependent color spaces.

In addition to device-dependent color spaces, there are device-independent color spaces, which are based on the visual capabilities of what is referred to as a standard observer. Such color spaces are, for instance, the XYZ color space defined by the International Commission on Illumination (Commission Internationale d'Éclairage, CIE), or the L*a*b* color space derived from it. The L*a*b* color components may be converted to XYZ color components and vice versa. To find out whether two colors are perceived as identical or different by the human eye under the same environmental conditions, in particular under the same illumination, it is enough to measure the XYZ or the L*a*b* color components, respectively. The L*a*b* color components form a color space with a lightness axis [L*] and two color axes [a*, b*], which one may imagine in the plane of a color circle with the lightness axes extending through the center.

U.S. Pat. No. 7,161,710 B1 describes the transformation of color spaces by composite rendering intents, for instance for printing applications.

Published, non-prosecuted German patent application DE 103 22 378 A1, which corresponds to U.S. patent publication No. 2004/0228525, describes a method of color transformation between color spaces by means of color profiles using rendering intents.

A device or a color-processing process may be characterized in terms of its color characteristics by associating all possible value combinations of the associated device-dependent color space with the XYZ color components human observers see when they look at the colors generated with the respective value combinations. For a printing process, every single CMYK value combination generates a different printed color. The XYZ components of the printed colors may be measured by a color measurement device and assigned to the CMYK value combinations. Such an association which establishes a relationship between device-dependent colors generated by a device or process and a device-independent color space (XYZ or L*a*b*) is referred to as a color profile, in the case of a printing process, as an output color profile. The definitions and data formats of color profiles have been standardized by the International Color Consortium (ICC). An ICC color profile saves the association between the color spaces in both directions, for instance XYZ=f1 (CMYK) and the inversion CMYK=f2 (XYZ). The association defined by a color profile may be implemented with the aid of a look-up table. For instance, if CMYK color components of a printing operation are to be associated with XYZ color components, the look-up table needs a memory space in which the associated XYZ color components are stored for every possible value combination of the CMYK color components. A disadvantage of this simple association process is, however, that the look-up table may become very large. Thus, in general, interpolation processes are applied.

The associations provided in the color profiles between device-dependent color spaces and a device-independent color space may be used for color transformations between the device-dependent color spaces. Thus, the color values [C1, M1, Y1, K1] of a first printing process may be converted into the color values [C2, M2, Y2, K2] of a second printing operation in a corresponding way to ensure that the visual impression of the second print is the same as that of the first print.

Figure 1:
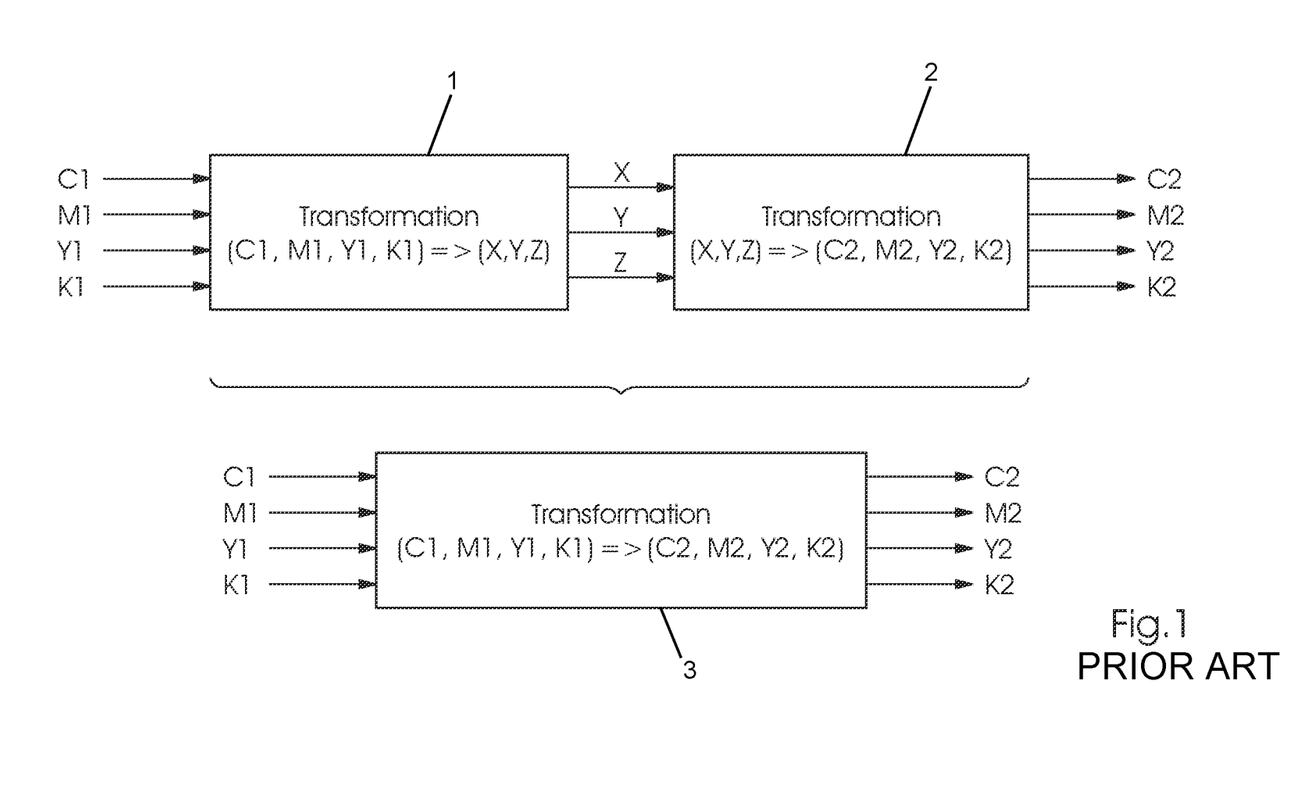
FIG. 1 is a schematic illustration of the color transformation principle for a printing process adaptation in accordance with the prior art.

FIG. 1 schematically illustrates the principle of such a prior art color transformation for adapting a printing process. The color values [C1, M1, Y1, K1] of the first printing process are transformed into XYZ color values in a first color transformation 1 and subsequently the XYZ color values are transformed into the color values [C2, M2, Y2, K2] of the second printing process in a second color transformation 2. The two-color transformations 1 and 2 may be combined to form an equivalent color transformation 3 which directly associates colors values [C1, M1, Y1, k1] and color values [C2, M2, Y2, K2]. Since the device independent XYZ intermediate color space is used to associate color values [C1, M1, Y1, K1] with [C2, M2, Y2, K2], which have the same XYZ color values, the associated process colors of the two printing processes are visually perceived as essentially identical within the process color gamut.

In the ICC specification, the device-independent color space, which is used to interlink the device-dependent color spaces in a color transformation operation, is referred to as a profile connection space (PCS). The profile connection space is the interface between the color profiles of the devices and processes. It is defined as an ideal color space of a non-transparent print in an ideal viewing environment and is based on the CIE 1931 XYZ standard color space and the CIE 1976 L*a*b* standard color space defined by the CIE. The white point of the profile connection space is defined by a standard illuminant of D50 commonly used in the graphic industry, i.e. an illumination level of 5000 Kelvin. This white point WPD50 has the following XYZ color values:

$X_{WPD50}$=0.9642 $Y_{WPD50}$=1.0000 $Z_{WPD50}$=0.8249.

There are variants of the allocations described in the ICC profiles between a device-dependent color space and the profile connection space. Their use depends on the rendering intent. These rendering intents are referred to as "relative colorimetric" or "relative", "absolute colorimetric" or "absolute", "perceptual", and "saturation". Among other aspects, they differ in terms of what is referred to as gamut mapping incorporated in the color profiles. Gamut mapping refers to the process or strategy used to adapt the different color gamuts of the device-dependent color spaces to one another. For instance, not all light and saturated colors that may be represented on a monitor are printable; especially not when they are printed onto lower-quality paper such as newsprint, which is comparatively gray. In such a case, based on the allocation of the color profile, the unprintable monitor colors need to be converted into similar colors on the margin of the color gamut of the printable colors to obtain an overall harmonious color impression without any subjective color distortions.

The perceptual rendering intent strives to factor in further characteristics that are important for the reproduction of an image, among them contrast, detail drawing, and actual viewing environment when mapping to the profile connection space. The saturation rendering intent mainly keeps the pure and saturated colors and is used to reproduce graphics.

The relative rendering intent is used, for instance, to map different printing processes to one another with a color transformation, making full use of the color gamut and the lightness gamut of the destination process. This in particular means that the white point of the source process, i.e. paper white, is mapped to the white point of the destination process. If the white point of the destination process is lighter than the white point of the source process, the colors with be reproduced lighter and with more brilliance when they are printed in the destination process after the color transformation.

In contrast, when the absolute rendering intent is applied, the white point and the XYZ color values of the source process are reproduced without changes in the destination process after the color transformation. For this purpose, the destination process needs to have a greater printable color gamut and a greater lightness range than the source process. The absolute rendering intent is used to reproduce a source printing process in a color-authentic final proof using a destination printing process, for instance on a high-end inkjet printer.

In the look-up tables created for the relative rendering intent, the XYZ color values allocated to the device-dependent color values in the profile connection space have been scaled in such a way that full use is made of the value range of the profile connection space. This means in particular that the white point WPD50 is allocated to the measured white point WP1 of the device-dependent color space (media white point) in the profile connection space. If the white point of a source printing process, for instance newspaper printing, has measured XYZ color values $[X_{WP1}, Y_{WP1}, Z_{WP1}]$, when the color profile is created, all color values [X1, Y1, Z1] measured for different value combinations [C1, M1, Y1, K1] of the color fields of a test print are scaled component by component by the ratio of the white points WPD50 and WP1 to obtain the associated color values $[X_{PCS1}, Y_{PCS1}, Z_{PCS1}]$ of the profile connection space.

$$X_{PCS1}=X1 \times X_{WPD50}/X_{WP1}$$

$$Y_{PCS1}=Y1 \times Y_{WPD50}/Y_{WP1}$$

$$Z_{PCS1}=Z1 \times Z_{WPD50}/Z_{WP1} \quad (1)$$

When the color profile for a destination printing process, for instance offset printing, with a white point WP2 is crated, the color values [X2, Y2, Z2] measured for different value combinations [C2, M2, Y2, K2] are scaled component by component by the ratio of the white points WPD50 and WP2 to obtain the associated color values $[X_{PCS2}, Y_{PCS2}, Z_{PCS2}]$ of the profile connection space.

$$X_{PCS2}=X2 \times X_{WPD50}/X_{WP2}$$

$$Y_{PCS2}=Y2 \times Y_{WPD50}/Y_{WP2}$$

$$Z_{PCS2}=Z2 \times Z_{WPD50}/Z_{WP2}. \quad (2)$$

Since linking the color profiles as shown in FIG. 1 leads to an association of identical value combinations $[X_{PCS1}, Y_{PCS1}, Z_{PCS1}]$ and $[X_{PCS2}, Y_{PCS2}, Z_{PCS2}]$ with one another in the profile connection space, color transformation from the source process into the destination process in accordance with the relative rendering intent results in the following equations:

$$X2=X1 \times X_{WP2}/X_{WP1}$$

$$Y2=Y1 \times Y_{WP2}/Y_{WP1}$$

$$Z2=Z1 \times Z_{WP2}/Z_{WP1}. \quad (3)$$

Thus device-dependent color values [C1, M1, Y1, K1] of the source process are transformed into device-dependent color values [C2, M2, Y2, K2] of the destination process in such a way that the corresponding XYZ color values are scaled in accordance with the ratio between the white points. Thus, as a result of relationship (3) in particular, the white point WP1 of the source process is transformed into the white point WP2 of the destination process.

Such a simple scaling of the XYZ color values as it is achieved in accordance with the ICC specification for the relative rendering intent is not optimal if the white points of the source process and of the destination process are comparatively far apart. In such a case, in the destination process, the relative distances between the colors printed on the media with different white points will not be perceived as equivalent to those in the source process despite the linear scaling of the XYZ color values because looking at the colors of the destination printing process, the human visual system will make chromatic adaptations as a function of the white point.

However, if no color value transformation between different devices is involved, color values output on an output device will change if the paper white is different compared to the paper white of the source process. Accordingly, a light red, for instance, which used to be printed on a light printing substrate, will be darker if the same printed image is output (for instance in the form of a PDF file) on a darker printing substrate.

The prior art methods of converting color values have disadvantages. In particular, it is desirable to be able to convert color values without having to simulate the color of the printing substrate (paper white).

SUMMARY OF THE INVENTION

An object of the present invention is to provide a method of effectively converting color values between two different device-dependent color spaces to obtain the same visual effect in both color spaces.

Consequently, the present invention relates to a method of transforming color values of a first device-dependent color space into color values of a second device-dependent color space so that the visual impression of the colors represented in both color spaces is essentially identical. The transformation of the color values of the first device-dependent color space into the color values of the second device-dependent color space uses at least one rendering intent used to describe color values. The transformation of the color values of the first device-dependent color space into the color values of the second device-dependent color space combines at least one absolute rendering intent describing absolute color values with at least one relative rendering intent describing relative color values, and wherein the transformation of the color values of the first device-dependent color space into the color values of the second device-dependent color space is made via the color values of an intermediate color space.

In accordance with the invention, at least one absolute rendering intent is combined with at least one relative rendering intent. In a preferred embodiment, "combine" is understood to mean cross-fading between the representations of the two rendering intents of absolute rendering intent and relative rendering intent. In other words, in some areas of the color space, the absolute colorimetric representation (the absolute rendering intent) is used, in other areas of the color space, in particular for the color of the substrate, preferably paper white, the relative colorimetric representation (the relative rendering intent) is preferred, and in between these areas, cross-fading is applied. Since the transformations of [C1,M1,Y1,K1]=>[X,Y,Z] and [X,Y,Z]=>[C2,M2,Y2,K2] (see FIG. 1) are not linear and since the cross-fading in [X, Y, Z] or, to be more precise, of the color space coordinates after linearized Bradford transformation, works with an exponent (see below), the following is approximation applies:
$[C2,M2,Y2,K2]=a*[C2,M2,Y2,K2]_{absolute}+(1-a)*[C2,M2,Y2,K2]_{relative}$; the cross-fading parameter a is a function of the position in the color space.

In a particularly preferred embodiment, combining absolute rendering intent and relative rendering intent as proposed by the invention means that when the color values of the first device-dependent color space are transformed into the color values of the second device-dependent color space, a part of the color values of the first device-dependent color space is transformed by means of at least one absolute rendering intent and a part of the color values of the first device-dependent color space is transformed by means of at least one relative rendering intent.

In a preferred embodiment, the at least one absolute rendering intent and the at least one relative rendering intent are colorimetric rendering intents.

In a further preferred embodiment, precisely one absolute rendering intent is combined with precisely one relative rendering intent when the color values of the first device-dependent color space are transformed into the color values of the second device-dependent color space.

In accordance with the invention, the transformation of the color values of the first device-dependent color space into the color values of the second device-dependent color space is made via the color values of an intermediate color space. In a preferred embodiment, the intermediate color space is a device-independent color space (profile connection space). In a particularly preferred embodiment, the color values of the intermediate color space correspond to the D50 2° standard observer.

In a further preferred embodiment, the color values of the first device-dependent color space are transformed into the color values of the intermediate color space and the color values of the intermediate color space are transformed into the color values of the second device-dependent color space. In a particularly preferred embodiment, the transformation of the color values of the first device-dependent color space into the color values of the intermediate color space combines at least one absolute rendering intent with at least one relative rendering intent. In a very particularly preferred embodiment, the transformation of the color values of the intermediate color space into the color values of the second device-dependent color space combines at least one absolute rendering intent with at least one relative rendering intent. In a specific embodiment, both the transformation of the color values into the intermediate color space and the transformation of the color values from the intermediate color space into the second device-dependent color space combines at least one absolute rendering intent with at least one relative rendering intent.

In standard ICC profiles there are three conversion tables for four rendering intents, i.e. i) for perceptual, ii) one for saturation, and iii) one for both absolute and relative. In a preferred embodiment no rendering intents from two different conversion tables are combined but only rendering intents within the same conversion table are combined. Accordingly, combining perceptual with absolute is not preferred.

Accordingly, in a particularly preferred embodiment, the color values of the first device-dependent color space are transformed into the color values of the intermediate color space via at least one profile comprising at least one conversion table and the color values of the intermediate color space are transformed into the color values of the second device-dependent color space via at least one profile that comprises at least one conversion table. In a particularly preferred embodiment, the at least one profile is at least one ICC profile. In this case, the intermediate color space is preferably the profile connection space (PCS).

In a particularly preferred embodiment, the color values of the first device-dependent color space are transformed into the color values of the intermediate color space via at least one profile which comprises at least one profile containing at least one conversion table, wherein absolute rendering intent and relative rendering intent use the same conversion table. In a further particularly preferred embodiment, the color values of the intermediate color space are transformed into the color values of the second device-dependent color space via at least one profile comprising at least one conversion table, wherein absolute rendering intent and relative rendering intent use the same conversion table. It is likewise possible for the combination of absolute rendering intent and relative rendering intent via at least one profile with at least one conversion table as proposed by the invention to be used at the same time both for the transformation into the color values of the intermediate color space and from the color values of the intermediate color space.

In a further preferred embodiment, the device to which the first device-dependent color space refers is a different device than the device to which the second device-dependent color space refers.

In a further preferred embodiment, the transformation of the color values of the first device-dependent color space into the color values of the second device-dependent color space is carried out during a printing operation in that a digital print image is printed onto a printing substrate in a printing machine, wherein the first device-dependent color space is the color space of the screen and the second device-dependent color space is the color space of the printing machine. In a particularly preferred embodiment, the printing process is selected from a list including relief printing, flat-bed printing, gravure, and combinations thereof, in particular offset printing, inkjet printing, flexographic printing, screen printing, and gravure.

In a further preferred embodiment, the transformation of the color values of the first device-dependent color space into the color values of the second device-dependent color space does not include a simulation of color values of the unprinted printing substrate.

In a further preferred embodiment, the color value of the unprinted printing substrate in the first device-dependent color space is mapped to the color value of the unprinted printing substrate in the second device-dependent color space.

In a further preferred embodiment, the color values of the unprinted printing substrate are paper white.

In a further preferred embodiment, the transformation of the color values of the first device-dependent color space into the color values of the second device-dependent color space causes the lightest point of the first device-dependent color space to be transformed into the lightest point of the second device-dependent color space in an output without print dots. In other words, the transformation is done in such a way that a color value which corresponds to the white point in a source color space, for instance unprinted paper if a printer color space is the source color space, is mapped to the white point in the output color space. In other words, unprinted areas in the input remain unprinted areas in the output, and no print dots are printed to simulate the darker paper white of the input.

In a further preferred embodiment, the at least one relative rendering intent contains black point compensation. This means that the darkest point of the input process is mapped to the darkest point of the output process. As a result of such a compensation, even shadow detail is maintained. Without such a compensation, all colors which are darker in the output color space than the respective darkest color after factoring in the relative/absolute/combined color transformation are cut off in the output process and clipped to the lower limit of the reproducible color body. Thus, disruptions in gradations are possible.

The present invention also refers to a printing machine for implementing the method of the invention. Preferred printing machines on which the method of the invention are carried out are offset printing presses, inkjet printing presses, flexographic printing presses, screen printing presses, and gravure printing presses.

The present invention also refers to the use of the method of the invention in a printing machine. Preferred printing machines for implementing the method of the invention is used are offset printing presses, inkjet printing presses, flexographic printing presses, screen printing presses, and gravure printing presses.

So far, the rendering intents used in the prior art aim at a satisfactory reproduction (photographic as well as photographic and saturation-maintaining and relative colorimetric rendering intent) or at an absolute reproduction (absolute rendering intent) of the device-specific input color body in the device-specific output color body. The relative colorimetric rendering intent and the relative colorimetric rendering intent with shadow detail compensation are regarded as simple implementations of a satisfactory representation.

By definition, the absolute rendering intent simulates the darker white point when transformations from processes with dark white points to processes with a lighter white point are simulated. In the packaging industry, this is often not desired. In contrast, the variants of the other rendering intents are configured to cause the entire color body of the input process to be deformed into the output color body. While this is done by simple multiplication of the white point and of the darkest point in XYZ for both variants of the relative rendering intent, the perceptive/saturation rendering intent uses the strategy of the respective ICC profile algorithm.

There are no known embodiments which implement a combination of absolute and relative rendering intent to the lightest point of the color body of the destination process.

A known prior art method involves an empty separation for paper white in the color body of the destination process. However, simply replacing the representation of the lightest point of the color body of the input process in the color body of the output process by empty separations leads to the manifestation of visible transitions perceived as unaesthetic. In particular transitions close to the lightest points of the input color body, for instance in wedding dresses or white blouses, are discontinuous in the color body of the destination process at the transition between white and a separation which is just not filled with empty separations anymore. So far, there is no known method which may be used by using standard ICC profiles.

Other features which are considered as characteristic for the invention are set forth in the appended claims.

Although the invention is illustrated and described herein as embodied in a method of transforming color spaces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In a preferred embodiment of the invention, original artwork data for a substrate with a white point $W_1$ are to be output on a substrate which has a very different white point $W_2$. ICC profiles that describe the processes are available for both processes. The two colorimetric rendering intents of "absolute rendering intent" and "relative rendering intent" are known.

Absolute rendering intent: exact reproduction of the measured color values (XYZ, L*a*b*) wherever the destination process permits.

$$\begin{pmatrix} x_2 \\ y_2 \\ z_2 \end{pmatrix} = \begin{pmatrix} x_1 \\ y_1 \\ z_1 \end{pmatrix} \quad (4)$$

The paper white of the input process is simulated, i.e. in some cases (destination substrate lighter than initial paper or of different color), white areas will be printed, too. Lighter colors are cut off if the destination paper is too dark.

Relative rendering intent: reproduction of the measured color values (XYZ, L*a*b*) in relation to the white point of the respective process.

Color coordinates (x,y,z) are scaled by the ratio of the coordinates of the white points.

$$\begin{pmatrix} x_2 \\ y_2 \\ z_2 \end{pmatrix} = \begin{pmatrix} x_1 \cdot \frac{x_{white,2}}{x_{white,1}} \\ y_1 \cdot \frac{y_{white,2}}{y_{white,1}} \\ z_1 \cdot \frac{z_{white,2}}{z_{white,1}} \end{pmatrix} \quad (5)$$

The color coordinates (x,y,z) may, for instance, be XYZ or a coordinate system K that is adapted to the sensitivity of the human eye. In this case, the color coordinates of input value and paper white need to be transformed into the coordinate system K as a first step and the scaled coordinates need to be transformed back. Paper white will remain unprinted in the destination process in any case. If the destination paper is dark, color hues will be darkened in a corresponding way.

What is desired, however, is often a behavior where the hues may be accurately reproduced when an area is intensely printed on (for instance a solid cyan area or a red composed of 100% magenta and 100% yellow) as it is the case with the absolute rendering intent. Towards paper white, the behavior is to correspond to the relative rendering intent where paper remains unprinted and shadow detail is preserved even in the lights.

Without ICC-based color management, such a behavior is attainable on an offset printing press by using the plates of the input paper, feeding the paper with the different white point $W_2$, and trying to set solid tone and dot gain of the standard for the original paper as well as possible. This process is only possible as long as the original plates may be used. It cannot work if the destination process uses more or fewer process colors than the source process, if spot colors in the source process are simulated by process colors in the destination process, if the two processes differ not just in terms of paper white but also in terms of process characteristics (location of the solid tones, overprinting behavior and the like) or if the destination process is a different printing technology.

The approach of the invention uses a method $$(x_2, y_2, z_2) = F((x_1, y_1, z_1)) \quad (6)$$

of transforming the color coordinates that is a combination of (4) and (5) and exhibits the desired behavior. The color coordinates x, y, and z may again be XYZ or a coordinate system adapted to the sensitivity of the human eye.

Two limit cases for the transformation are possible:
i) relative behavior at paper white:

$$F((x_{white,1}, y_{white,1}, z_{white,1})) = \qquad (7)$$

$$(x_{white,2}, y_{white,2}, z_{white,2}) = \begin{pmatrix} x_{white,1} \cdot \left(\frac{x_{white,2}}{x_{white,1}}\right)^1 \\ y_{white,1} \cdot \left(\frac{y_{white,2}}{y_{white,1}}\right)^1 \\ z_{white,1} \cdot \left(\frac{z_{white,2}}{z_{white,1}}\right)^1 \end{pmatrix}$$

ii) absolute behavior if at least one of the color coordinates is small:

$$\lim_{x_1 \mapsto 0} F((x_1, y_1, z_1)) = (x_1, y_1, z_1) = \begin{pmatrix} x_1 \cdot \left(\frac{x_{white,2}}{x_{white,1}}\right)^0 \\ y_1 \cdot \left(\frac{y_{white,2}}{y_{white,1}}\right)^0 \\ z_1 \cdot \left(\frac{z_{white,2}}{z_{white,1}}\right)^0 \end{pmatrix} \quad (8)$$

$$\lim_{y_1 \mapsto 0} \text{ und } \lim_{z_1 \mapsto 0} : \text{in an analogous way} \qquad (9)$$

Combining equations (7) and (8), the transformation may be expressed as follows:

$$F((x_1, y_1, z_1)) = \begin{pmatrix} x_1 \cdot \left(\frac{x_{white,2}}{x_{white,1}}\right)^{\alpha_x} \\ y_1 \cdot \left(\frac{y_{white,2}}{y_{white,1}}\right)^{\alpha_y} \\ z_1 \cdot \left(\frac{z_{white,2}}{z_{white,1}}\right)^{\alpha_z} \end{pmatrix} \quad (10)$$

The exponents $\alpha$ are a function of the color location, and for paper white $\alpha=1$ needs to apply and $\alpha \mapsto 0$ needs to apply when a color coordinate tends to zero. In theory, exponents $\alpha_x$, $\alpha_y$, $\alpha_z$ may be different. In the following, the first approach is limited to a case in which the exponents are identical for all components, $\alpha_x = \alpha_y = \alpha_z = \alpha$. Thus, the transformation equation (10) becomes $$F((x_1, y_1, z_1)) = \begin{pmatrix} x_1 \cdot \left(\frac{x_{white,2}}{x_{white,1}}\right)^{\alpha} \\ y_1 \cdot \left(\frac{y_{white,2}}{y_{white,1}}\right)^{\alpha} \\ z_1 \cdot \left(\frac{z_{white,2}}{z_{white,1}}\right)^{\alpha} \end{pmatrix} \quad (11)$$

Now the challenge is to determine the exponent $\alpha$ as a function of the color coordinates $x_1$, $y_1$, $z_1$ and $x_{white,1}$, $y_{white,1}$, $z_{white,1}$. In addition to the conditions resulting from (7) and (9) further conditions need to be fulfilled:

$\alpha=1$ for $xyz_1 = xyz_{white,1}$ $\lim_x \mapsto_0 \alpha=0$ and $\lim_y \mapsto_0 \alpha=0$ and $\lim_z \mapsto_0 \alpha=0$ α needs to be between 0 and 1 for all values of xyz between 0 and $xyz_{white}$.

α needs to be strictly increasing for every component of xyz, and

α needs to be continuous.

For the transformations $W_1 \mapsto W_2$ and $W_2 \mapsto W_1$ to behave in a precisely inverted way relative to one another, it needs to be irrelevant whether α is determined for the original coordinates or for the transformed coordinates. This means $\alpha(xyz_1, xyz_{white,1}) = \alpha(xyz_2, xyz_{white,2})$.

Here the abbreviation $xyz=(x,y,z)$ was introduced for the entire coordinate vector.

To be able to guarantee condition 6 mentioned above, i.e. independence of the direction of the transformation, an intermediate color space that is independent of the white point and has the coordinates $xyz_m=(x_m, y_m, z_m)$ is introduced as an initial step. If every input white point $W_1$ is at least formally mapped to the intermediate color space and from there to the coordinates of the destination white point $W_2$, independence of the direction is definitely ensured if the exponent α is determined in this intermediate color space.

For reasons of simplicity, the following paragraph will initially only deal with one component x of the color space and the mapping into the intermediate space in accordance with $x=x_1$ or $x_2$ is described as $$x = f(x_m, x_{white}) := f(x_m) \quad (12)$$

written without the exponent α. For the function $f$, the following conditions need to apply:

1. $f(0) = 0$
2. $\frac{df}{dx_m}|_{x_m=0} = 1$
3. $f(1) = x_{white}$
4. $\frac{df}{dx_m} > 0 \; \forall \; 0 \leq x_m \leq 1$ To make sure that these conditions apply, the following approach is used for a differential equation to determine $f$:

$$\frac{df(x_m)}{dx_m} = \frac{x_{white} - f(x_m)}{x_{white}} \cdot \frac{1}{(1-x_m)} \quad (13)$$

The general solution to this equation is $$f(x_m) = c_1 \cdot (x_m - 1)^{\frac{1}{x_{white}}} + x_{white} \quad (14)$$

Substituting the boundary conditions results in $$x = f(x_m) = x_{white} \cdot \left(1 - (1-x_m)^{\frac{1}{x_{white}}}\right) \quad (15)$$

Equation (15) may now be rearranged for the direction from absolute color coordinates on paper white $W_1$ and $W_2$, respectively, into the intermediate color space:

$$x_m = 1 - \left(1 - \frac{x}{x_{white}}\right)^{x_{white}} \quad (16)$$

Substituting equation (16) for $x=x_1$ in equation (15) for $x=x_2$ results in transformation equation from $x_1$ with $x_{white,1}$ to $x_2$ with $x_{white,2}$:

$$x_2 = x_{white,2} \cdot \left[1 - \left(1 - \frac{x_1}{x_{white,1}}\right)^{\frac{x_{white,1}}{x_{white,2}}}\right] \quad (17)$$

In order to be able to write equation (17) in the form $$x_2 = x_1 \cdot \left(\frac{x_{white,2}}{x_{white,1}}\right)^\alpha$$

we have $$x_2 = x_1 \cdot \left(\frac{x_{white,2}}{x_{white,1}}\right)^\alpha \text{ with} \quad (18)$$

$$\alpha = \frac{\log\left\{\frac{x_{white,2}}{x_1}\left[1 - \left(1 - \frac{x_1}{x_{white,1}}\right)^{\frac{x_{white,1}}{x_{white,2}}}\right]\right\}}{\log\left\{\frac{x_{white,2}}{x_{white,1}}\right\}}$$

Since the relation between $x_1$ and $x_2$ in equation (17) is independent of the direction of the transformation due to the use of the intermediate color space and since equation (18) is just a different way of expressing this relation, it follows that equation (18) is likewise independent of the direction of the transformation.

Equation (18) may now be applied to the three color space coordinates x, y, and z separately. This results in a relative colorimetric behavior towards white and in an absolute colorimetric behavior towards black. However, this method has two particularities:

The exponents α differ for x, y, and z, which may cause undesired color shifts.

As soon as the value of one of the coordinates x, y, or z is significantly different from 0, this coordinate will no longer be transformed in a manner similar to an absolute colorimetric way.

Thus, a representative coordinate q is introduced as having the following properties:

i) q is transformed like x, y, and z, i.e.

$$q_2 = q_1 \cdot \left(\frac{q_{white,2}}{q_{white,1}}\right)^\alpha \quad (19)$$

ii) q tends towards 0 as soon as at least one of coordinates x, y or z tends towards 0.

A coordinate that fulfills these conditions is the geometric mean of coordinates x, y and z $$q = \sqrt[3]{x \cdot y \cdot z} \quad (20)$$

$$q_{white} = \sqrt[3]{x_{white} \cdot y_{white} \cdot z_{white}} \quad (21)$$

etc.

Thus, a common exponent α for all coordinates may be determined and in summarized form, the final transformation equation is $$x_2 = x_1 \cdot \left(\frac{x_{white,2}}{x_{white,1}}\right)^\alpha, \quad (22)$$

$$y_2 = y_1 \cdot \left(\frac{y_{white,2}}{y_{white,1}}\right)^\alpha,$$

$$z_2 = z_1 \cdot \left(\frac{z_{white,2}}{z_{white,1}}\right)^\alpha$$

$$\text{with } \alpha = \frac{\log\left\{\frac{q_{white,2}}{q_1} \cdot \left[1 - \left(1 - \frac{q_1}{q_{white,1}}\right)^{\frac{q_{white,1}}{q_{white,2}}}\right]\right\}}{\log\left\{\frac{q_{white,2}}{q_{white,1}}\right\}} \quad (23)$$

$$\text{and } q = \sqrt[3]{x \cdot y \cdot z}$$

What needs to be factored in in this context is that coordinates xyz do not necessarily correspond to XYZ. If required, an initial step needs to be to apply a linear transformation to the XYZ coordinates such as the Bradford matrix known in principle in the prior art and the inverse Bradford matrix after the transformation. It goes without saying that in this case, the coordinates of the white points need to be dealt with in an analogous way.

In addition, one must bear in mind that the utilized color coordinates xyz are always to be understood as absolute, i.e. they are not scaled using the coordinates of the white point. Since internally most calculations with ICC profiles mostly use color coordinates in units of the white point, this scaling must be kept in mind. Since it is a simple multiplication and the white points are known at all times, however, this does not result in any limitations to the applicability.

For a later examination of borderline cases it makes sense to represent equations (22) and (23) in centered color space coordinates, i.e. with color coordinates that have been scaled with the coordinates of the white point.

$$\tilde{x} = \frac{x}{x_{white}} \quad (24)$$

$$\tilde{y} = \frac{y}{y_{white}}$$

$$\tilde{z} = \frac{z}{z_{white}}$$

$$\tilde{q} = \frac{q}{q_{white}}$$

Substituting (24) in (22) we get $$\tilde{x}_2 = \tilde{x}_1 \cdot \left(\frac{x_{white,2}}{x_{white,1}}\right)^{\alpha - 1} \quad (25)$$

and $\tilde{y}, \tilde{z}$ in an analogous way.

Substituting (24) in (23), for the exponent $\alpha$ we get $$\alpha = \frac{\log\left\{\frac{1}{\tilde{q}_1} \cdot \left(\frac{q_{white,2}}{q_{white,1}}\right) \cdot \left[1 - (1 - \tilde{q}_1)^{\frac{q_{white,1}}{q_{white,2}}}\right]\right\}}{\log\left\{\frac{q_{white2}}{q_{white1}}\right\}} \quad (26)$$

-continued $$= 1 + \frac{\log\left\{\frac{1}{\tilde{q}_1} \cdot \left[1 - (1 - \tilde{q}_1)^{\frac{q_{white,1}}{q_{white,2}}}\right]\right\}}{\log\left\{\frac{q_{white,2}}{q_{white,1}}\right\}}.$$

If an $\tilde{\alpha}$ for the centered color space coordinates is defined as $$\tilde{\alpha} = \alpha - 1 = \frac{\log\left\{\frac{1}{\tilde{q}_1} \cdot \left[1 - (1 - \tilde{q}_1)^{\frac{q_{white,1}}{q_{white,2}}}\right]\right\}}{\log\left\{\frac{q_{white,2}}{q_{white,1}}\right\}} \quad (27)$$

equation (25) becomes $$\tilde{x}_2 = \tilde{x}_1 \cdot \left(\frac{x_{white,2}}{x_{white,1}}\right)^{\tilde{\alpha}} \quad (28)$$

and $\tilde{y}, \tilde{z}$ in an analogous way.

Substituting $\tilde{\alpha}$ from equation (27) in (28) and introducing new abbreviations, this may be simplified as $$\tilde{x}_2 = \tilde{x}_1 \cdot \exp\left(\underbrace{\frac{\log\left\{\frac{x_{white,1}}{x_{white,2}}\right\}}{\log\left\{\frac{q_{white,1}}{q_{white,2}}\right\}}}_{:=\beta_x} \cdot \underbrace{\log\left\{\frac{1}{\tilde{q}_1} \cdot \left[1 - (1 - \tilde{q}_1)^{\frac{q_{white,1}}{q_{white,2}}}\right]\right\}}_{:=\tilde{f}_q}\right) \quad (29)$$

$$= \tilde{x}_1 \cdot \tilde{f}_q^{\beta_x}$$

Thus, the transformation of the centered coordinates may be written in a compact way as $$\tilde{x}_2 = \tilde{x}_1 \cdot \tilde{f}_q^{\beta_x} \quad (30)$$

$$\tilde{y}_2 = \tilde{y}_1 \cdot \tilde{f}_q^{\beta_y}$$

$$\tilde{z}_2 = \tilde{z}_1 \cdot \tilde{f}_q^{\beta_z}$$

$$\text{with } \beta_x = \frac{\log\left\{\frac{x_{white,1}}{x_{white,2}}\right\}}{\log\left\{\frac{q_{white,1}}{q_{white,2}}\right\}} \quad (31)$$

$$\beta_y = \frac{\log\left\{\frac{y_{white,1}}{y_{white,2}}\right\}}{\log\left\{\frac{q_{white,1}}{q_{white,2}}\right\}}$$

$$\beta_z = \frac{\log\left\{\frac{z_{white,1}}{z_{white,2}}\right\}}{\log\left\{\frac{q_{white,1}}{q_{white,2}}\right\}}$$

$$\text{and } \tilde{f}_q = \frac{1}{\tilde{q}_1} \cdot \left[1 - (1 - \tilde{q}_1)^{\frac{q_{white,1}}{q_{white,2}}}\right] \quad (32)$$

Factors β in equation (31) may be calculated already as soon as the transformation is stopped because they only depend on the color space coordinates of the white points.

Although a characteristic of transformation F described by equations (30), (31), (32) is that the transformation of white point $W_1$ into white point $W_2$ and from white point $W_2$ to white point $W_1$ behave in a precisely inverted way relative to one another, i.e.

$$F_{W_2} \mapsto_{W_1}(F_{W_1} \mapsto_{W_2}(xyz)) = xyz. \tag{33}$$

Yet the result of the transformation is not independent of whether the transformation from white point $W_1$ to white point $W_3$ is initially made via white point $W_2$ or whether the direct transformation is calculated, i.e. in general, $$F_{W_2} \mapsto_{W_3}(F_{W_1} \mapsto_{W_2}(xyz)) \neq F_{W_1} \mapsto_{W_3}(xyz) \tag{34}$$

applies.

To achieve this, the transformation may be modified in such a way that no direct transformation is made from source white point to destination white point, but instead the white point of illumination and observation condition of D50 illumination type and 2° observer (D50O2) defined in the ICC specification is selected as intermediate point. We get this transformation G on the basis of transformation F described in equations (30), (31), (32) as $$G_{W_1} \mapsto_{W_2}(xyz) = F_{W_{D50O02}} \mapsto_{W_2}(F_{W_1} \mapsto_{W_{D50O02}}(xyz)) \tag{35}$$

In general, all centered color space coordinates $\tilde{x}$, $\tilde{y}$, and $\tilde{z}$ ought to be between 0 and 1. Thus equation (32) is only valid for this interval. However, in some cases, negative values or values above 1 may occur. This may happen, for instance, when phosphorescent colors are examined. Another reason for irregular centered color space coordinates may be a linear approximation for a Bradford transformation to the color space coordinates if extremely chromatic colors are being transformed. To continue the transformation for these values, colors with at least one non-positive color space coordinate ought to be treated in an absolute colorimetric way and colors with a color space coordinate product above 1 ought to be treated in a relative colorimetric way.

Thus, transformation equation (30) may be converted into $$\tilde{x}_2 = \begin{cases} \tilde{x}_1 \cdot \frac{x_{white,1}}{x_{white,2}} & : \tilde{x} \leq 0 \vee \tilde{y} \leq 0 \vee \tilde{z} \leq 0 & \text{absolute} \\ \tilde{x}_1 & : \tilde{x} \cdot \tilde{y} \cdot \tilde{z} \geq 1 & \text{relative} \\ \tilde{x}_1 \cdot \tilde{f}_q^{\beta_x} & : & \text{others} & \text{mixed} \end{cases} \tag{36}$$

$\tilde{y}, \tilde{z}$: in an analogous way.

The method presented herein is based on determining a factor $\tilde{f}_q$ for scaling the geometric means q of the color space coordinates with the aid of equation (32) and dividing it among the color space coordinates on the basis of exponents $\beta_x$, $\beta_x$, $\beta_z$. Initially, this method will fail precisely when truly different white points $W_1$ and $W_2$ have the same geometric mean, i.e.

$$x_{white,1} \cdot y_{white,1} \cdot z_{white,1} = x_{white,2} \cdot y_{white,2} \cdot z_{white,2} \tag{37}$$

and $$(x_{white,1} \neq x_{white,2} \vee y_{white,1} \neq y_{white,2} \vee z_{white,1} \neq z_{white,2}) \tag{38}$$

This may occur if the ratios $$\frac{x_{white,2}}{x_{white,1}},$$

$$\frac{y_{white,2}}{y_{white,1}},$$

$$\frac{z_{white,2}}{z_{white,1}}$$

have both values above 1 and values below 1. Therefore, the logarithmic algebraic signs are defined as $$\Sigma_x = \Sigma\left(\frac{x_{white,2}}{x_{white,1}}\right), \Sigma_y = \Sigma\left(\frac{y_{white,2}}{y_{white,1}}\right) \Sigma_Z = \Sigma\left(\frac{z_{white,2}}{z_{white,1}}\right) \tag{39}$$

$$\text{with } \Sigma(r) = \begin{cases} -1 & : r < 1 \\ 0 & : r = 1 \\ 1 & : r > 1 \end{cases} \tag{40}$$

as well as the dominant logarithmic algebraic sign as $$\overline{\Sigma} = \begin{cases} -1 & : \Sigma_x + \Sigma_y + \Sigma_z < 1 \\ 1 & : \text{other} \end{cases} \tag{41}$$

Thus the ratio of the geometric means of the white points may be substituted in equations (31) and (32)

$$\frac{q_{white,1}}{q_{white,2}} \mapsto \sqrt[3]{\left(\frac{x_{white,1}}{x_{white,2}}\right)^{\sigma_x} \cdot \left(\frac{y_{white,1}}{y_{white,2}}\right)^{\sigma_y} \cdot \left(\frac{z_{white,1}}{z_{white,2}}\right)^{\sigma_z}} \tag{42}$$

Here weights $\sigma = -1, 1$ which determine which ratios are applied inversely and which ratios are applied directly remain to be determined.

For the direct transformation from white point $W_1$ to $W_2$, the component whose logarithmic sign deviates from the dominant sign is to be applied inversely.

This means $$\sigma_x = \begin{cases} -1 & : \Sigma_x \neq \overline{\Sigma} \\ 1 & : \text{other} \end{cases} \tag{43}$$

and $\sigma_y, \sigma_z$ in an analogous manner

Thus the ratio in equation (42) may only become 1 if the two white points $W_1$ and $W_2$ are identical. In this case the entire transformation is an identity and unnecessary.

For the transformation with the intermediate step via D50O02, one may in general assume that the color space coordinates of the white points are below those of D50O02. Thus, in the transformation to D50O02, the ratios which have a positive logarithmic sign $\Sigma$ are inverted and in the transformation from D50O02 the ratios with a negative logarithmic sign $\Sigma$ are inverted:

$$\frac{q_{white,1}}{q_{D50O02}} \mapsto \sqrt[3]{\left(\frac{x_{white,1}}{x_{D50O02}}\right)^{-\Sigma_{1,x}} \cdot \left(\frac{y_{white,1}}{y_{D50O02}}\right)^{-\Sigma_{1,y}} \cdot \left(\frac{z_{white,1}}{z_{D50O02}}\right)^{-\Sigma_{1,Z}}} \tag{44}$$

with $$\Sigma_{1,x} = \Sigma\left(\frac{x_{white,1}}{x_{D50O02}}\right) \Sigma_{1,y} = \Sigma\left(\frac{y_{white,1}}{y_{D50O02}}\right) \Sigma_{1,z} = \Sigma\left(\frac{z_{white,1}}{z_{D50O02}}\right) \tag{45}$$

$$\frac{q_{D50O02}}{q_{white,2}} \mapsto \sqrt[3]{\left(\frac{x_{D50O02}}{x_{white,2}}\right)^{-\Sigma_{2,x}} \cdot \left(\frac{y_{D50O02}}{y_{white,2}}\right)^{-\Sigma_{2,y}} \cdot \left(\frac{z_{D50O02}}{z_{white,2}}\right)^{-\Sigma_{2,z}}} \tag{46}$$

with

-continued $$\sum\nolimits_{2,x} = \sum\left(\frac{x_{D50O02}}{x_{white,2}}\right) \quad \sum\nolimits_{2,y} = \sum\left(\frac{y_{D50O02}}{y_{white,2}}\right) \quad \sum\nolimits_{2,z} = \sum\left(\frac{z_{D50O02}}{z_{white,2}}\right) \quad (47)$$

These ratios may likewise only be 1 if the respective white point $W_1$ [$W_2$] precisely corresponds to the white point of the illuminant condition. In this case, the transformation from $W_1$ to D50O02 [and from D50O02 to $W_2$, respectively] is the identical representation and unnecessary.

FIG. 1 is a schematic illustration of the color transformation principle for a printing process adaptation in accordance with the prior art. A first transformation 1 transforming the color values [C1, M1, Y1, K1] of the first printing process into XYZ color values and a second color transformation 2 transforming the XYZ color values into the color values [C2, M2, Y2, K2] of the second printing process are carried out successively. The two-color transformations 1 and 2 may be combined to form an equivalent color transformation 3 which directly assigns color values [C1, M1, Y1, K1] and color values [C2, M2, Y2, K2] to one another. Since color values [C1, M1, Y1, K1] and [C2, M2, Y2, K2] which are allocated to one another via the device-independent XYZ intermediate color space have the same XYZ color values, the associated process colors of the two printing processes are essentially perceived as visually identical within the process color gamut.

Figure 2:
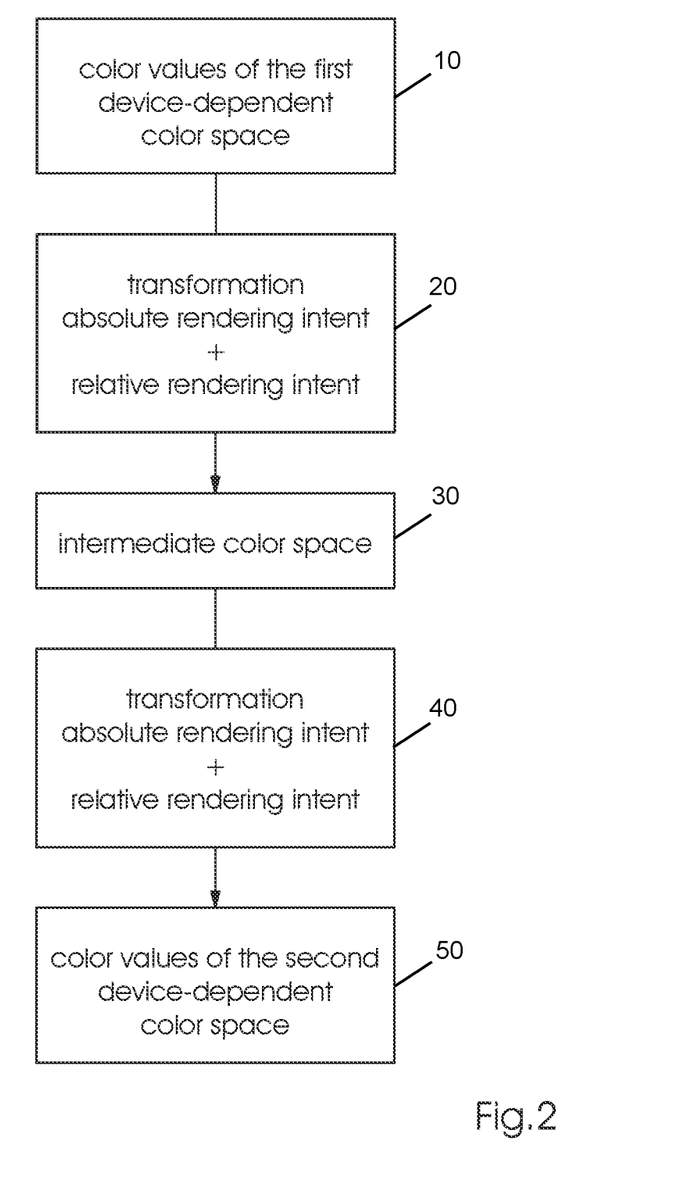
FIG. 2 is a flow chart showing a method of the invention.

FIG. 2 schematically shows the method of the invention. In step 10, the color values of a first device-dependent color space are transformed into an intermediate color space. The transformation into the intermediate color space is achieved using a combination of absolute and relative rendering intent, steps 20 and 30. The color values that have been transformed to the intermediate color space are transformed into the color values of the second device-dependent color space. The transformation from the intermediate color space is achieved using a combination of absolute and relative rendering intent, steps 40 and 50.

The following is a summary list of reference numerals and the corresponding structure used in the above description of the invention:

1 first color transformation
2 second color transformation
3 third color transformation

The invention claimed is:

1. A method of transforming color values of a first device-dependent color space into color values of a second device-dependent color space so that a visual impression of colors represented in both of the first and second device-dependent color spaces is generally identical, which comprises the steps of:
performing a transformation of the color values of the first device-dependent color space into the color values of the second device-dependent color space using at least one rendering intent which is used to describe the color values, wherein the transformation of the color values of the first device-dependent color space into the color values of the second device-dependent color space combines at least one absolute rendering intent which describes absolute color values with at least one relative rendering intent which describes relative color values, and wherein the transformation of the color values of the first device-dependent color space into the color values of the second device-dependent color space is made via the color values of an intermediate color space;

transforming the color values of the first device-dependent color space into the color values of the intermediate color space and the color values of the intermediate color space are transformed into the color values of the second device-dependent color space, wherein the transformation of the color values of the first device-dependent color space into the color values of the intermediate color space combines the at least one absolute rendering intent with the at least one relative rendering intent.

2. The method according to in claim 1, wherein the at least one absolute rendering intent and the at least one relative rendering intent are colorimetric rendering intents.

3. The method according to claim 1, wherein the intermediate color space is a device-independent color space.

4. The method according to claim 1, wherein the color values of the intermediate color space correspond to a D50 2° standard observer.

5. The method according to claim 1, wherein the transformation of the color values of the intermediate color space into the color values of the second device-dependent color space combines the at least one absolute rendering intent with the at least one relative rendering intent.

6. The method according to claim 1, which further comprises transforming the color values of the first device-dependent color space into the color values of the intermediate color space via at least one profile which has at least one conversion table, wherein the color values of the intermediate color space are transformed into the color values of the second device-dependent color space via at least one profile which contains at least one conversion table, and wherein the at least one absolute rendering intent and the at least one relative rendering intent use a same conversion table.

7. The method according to claim 6, wherein the at least one profile is at least one International Color Consortium (ICC) profile.

8. The method according to claim 1, wherein a device to which the first device-dependent color spaces refers is a different device than a device to which the second device-dependent color space refers.

9. The method according to claim 1, which further comprises performing the transformation of the color values of the first device-dependent color space into the color values of the second device-dependent color space during a printing operation in which a digital print image is printed onto a printing substrate by a printing machine and wherein the first device-dependent color space is the color space of a screen and the second device-dependent color space is the color space of the printing machine.

10. The method according to claim 9, which further comprises selecting the printing operation from the group consisting of: relief printing, flat-bed printing, gravure printing, offset printing, inkjet printing, flexographic printing, screen printing, and rotogravure.

11. The method according to claim 9, wherein the transformation of the color values of the first device-dependent color space into the color values of the second device-dependent color space does not include any simulation of color values of the printing substrate being an unprinted printing substrate.

12. The method according to claim 11, wherein the color values of the unprinted printing substrate are paper white.

13. The method according to claim 1, wherein the transformation of the color values of the first device-dependent color space into the color values of the second device-dependent color space transforms a lightest point of the first device-dependent color space into a lightest point of the second device-dependent color space on an output without print dots.

14. The method according to claim 1, wherein the at least one rendering intent contains black point compensation.

15. A printing machine configured for implementing the method according to claim 1.

16. A non-transitory memory medium storing computer executable instructions which when processed by a processor of a printing machine perform the method according to claim 1.

* * * * *